US005865205A

United States Patent [19]
Wilmer

[11] Patent Number: 5,865,205
[45] Date of Patent: Feb. 2, 1999

[54] DYNAMIC GAS FLOW CONTROLLER

[75] Inventor: Michael E. Wilmer, Portola Valley, Calif.

[73] Assignee: Applied Materials, Inc., Santa Clara, Calif.

[21] Appl. No.: 840,242

[22] Filed: Apr. 17, 1997

[51] Int. Cl.⁶ .................................................. G05D 7/06
[52] U.S. Cl. .............................. 137/2; 73/1.16; 137/486; 137/487.5
[58] Field of Search .......................... 137/2, 486, 487.5; 73/1.16, 1.35

[56] References Cited

U.S. PATENT DOCUMENTS

| | | | |
|---|---|---|---|
| 1,097,834 | 5/1914 | Anderson | 73/1.16 |
| 4,064,898 | 12/1977 | Petersen et al. | 137/240 |
| 4,285,245 | 8/1981 | Kennedy | 73/861 |
| 4,345,610 | 8/1982 | Herter et al. | 137/7 |
| 4,383,547 | 5/1983 | Lorenz et al. | 137/240 |
| 4,466,054 | 8/1984 | Shigemasa et al. | 364/162 |
| 4,535,812 | 8/1985 | Miller | 137/624 |
| 4,546,426 | 10/1985 | Hafner et al. | 364/153 |
| 4,718,443 | 1/1988 | Adney et al. | 137/486 X |
| 4,877,051 | 10/1989 | Day | 137/486 |
| 4,917,136 | 4/1990 | Ohmi et al. | 137/15 |
| 4,930,538 | 6/1990 | Browne | 137/269 |
| 5,129,418 | 7/1992 | Shimomura et al. | 137/486 |
| 5,394,755 | 3/1995 | Sudo et al. | 73/861 |
| 5,488,967 | 2/1996 | Minami et al. | 137/1 |
| 5,497,316 | 3/1996 | Sierk et al. | 364/140 |
| 5,744,695 | 4/1998 | Forbes | 73/1.16 |

OTHER PUBLICATIONS

*Modern Digital Control Systems*, Raymond G. Jacquot, Marcel Dekker, Inc. (N.Y.), 2nd Ed., pp. 108–109, 1995.
Reprint from Semiconductor International, Oct. 1993, *Improving MFC Reliability Using Gas Purification*, Cahners Publishing Company, pp. 1–5.
Application Note, Unit Instruments, Inc.; Orange, CA, "*Basics of tThermal Mass Flow Control*", SLASP 13–10–17–90.
Application Note, Unit Instruments, Inc.; Orange, CA, "*Thermal Siphoning in Mass Flow Controllers*", SLASP 12–11–19–90.

*Primary Examiner*—Stephen M. Hepperle
*Attorney, Agent, or Firm*—Blakely, Sokoloff, Taylor & Zafman

[57] ABSTRACT

A method and apparatus for controlling the delivery of a gas from a reservoir to a semiconductor process chamber. In accordance with the present invention, a reservoir, having an inlet and outlet isolation valve and a known volume, is filled with a gas upon the initiation of process recipe step. The temperature and pressure of the gas in the reservoir are measured to determine an initial mass of the gas residing within the reservoir. The flow of gas from the reservoir to the process chamber is metered by a variable flow valve under the control of a self-calibrating, dynamic flow control circuit comprising a flow control servo loop (flow control circuit) and a calibration servo loop (calibration circuit). The variable flow valve is situated in a gas flow path between the reservoir and process chamber at a point upstream of a orifice. In operation, gas is delivered to the process chamber by releasing the gas from the reservoir and directing the gas through the variable flow valve and sonic orifice and into the process chamber. The flow control servo loop is used to dynamically control the variable flow valve in response to a measured gas flow rate. When the flow of gas to the process chamber is terminated, the temperature and pressure of the gas residing in the reservoir is again measured to determine the final mass of gas residing in the reservoir. The initial mass and final mass of gas values are compared to determine the actual mass of gas released from the reservoir during the recipe step. This value serves as an input to the calibration servo loop to update the system calibration constant. The execution of the calibration servo loop serves as a continuous self calibration of the dynamic servo loop.

23 Claims, 6 Drawing Sheets

DYNAMIC GAS FLOW CONTROLLER

FIELD OF THE INVENTION

The present invention relates generally to a gas flow system and method for controlling a gas flow. More specifically, the invention relates to a self-calibrated dynamic gas flow control method and apparatus for controlling the delivery of a gas to process chamber or other point-of-use location.

BACKGROUND OF THE INVENTION

It is known that in many industrial processes it is necessary to control the specific amounts of gas and gas mixtures delivered to point-of-use locations with a high degree of accuracy. Particularly, in semiconductor processing it has become increasingly important to control the specific mass of gases delivered during the fabrication of semiconductor devices. As the speed of next generation semiconductor devices increases, and the size/dimension of next generation semiconductor devices decreases, the degree of accuracy and control over the fabrication of next generation semiconductor devices must increase. As the architecture of semiconductor devices falls below the three submicron scale the semiconductor industry must find more accurate methods for delivering specific amounts of gas to a process chamber. The use and benefits of the present invention are described herein in relation to semiconductor processing, and more specifically, to the delivery of a gas to a process chamber. It is appreciated, however, that such a description is merely illustrative and that the present invention is applicable in other fields where it is desired to precisely control the amount of gas being delivered to a point-of-use location.

One prior art method for delivering a gas to a semiconductor process chamber includes the use of a Mass Flow Controller (MFC). FIG. 1 illustrates a prior art Mass Flow Controller (MFC) that is used to control gas flow. The MFC is calibrated to deliver a specific mass of gas to a process chamber within a specified amount of time. For example, an MFC may be calibrated to deliver 100 standard cubic centimeters per minute (sccm) of nitrogen gas ($N_2$) to a process chamber.

In order to control flow of gas the MFC divides the flow of gas between heated sensing tube (sensor) 110 and flow restriction bypass (bypass) 120. The MFC divides the flow of gas such that a majority of the gas flows through bypass 120 and only a small portion of gas flows through sensor 110.

Mass flow is measured in sensor 110. As the gas flow passes through heater coil (coil) 111 the gas picks up and carries heat toward heater coil (coil) 112. The movement of heat by the gas develops a temperature difference between the two coils. Coils 111 and 112 are both heaters but also act as resistance temperature detectors (RTDs) that measure the temperature of the gas. Thus, as the gas flows between coil 111 and coil 112, the change in temperature between coil 111 and coil 112 is measured and can be correlated to the mass flow rate of the gas by the MFC control system 130.

Once the temperature difference is measured and the correlating mass flow rate of the particular gas is determined, control system 130 adjusts the position of control valve 140. The position of control valve 140 is set in order to obtain the desired (or calibrated) flow rate for the particular gas being used.

One problem with the method associated with the MFC for delivering a specific mass of gas to a process chamber is the degree to which the MFC method is accurate. MFC's are currently designed to run at 40 to 80% of their actual calibrated flow rate with an accuracy level of approximately 5%. For example, with respect to the MFC for $N_2$ calibrated with a flow rate of 100 sccm, described above, that particular MFC is designed to deliver $N_2$ at flow rates in the range of 40–80 sccm. Outside the 40–80% range the accuracy level of the MFC falls off. Next generation semiconductor devices require fabrication processes with greater accuracy than the prior art MFCs.

Another problem associated with MFCs is that they offer a limited dynamic range. The dynamic range is the ratio of the maximum and minimum controlled flow rates. As mentioned above, most MFCs are designed to run at 40 to 80% of their actual calibrated flow rate to achieve an accuracy of approximately 5%. As such, the dynamic range of such devices is limited to a ratio of approximately 2 to 1.

Another problem with the MFC is that most processes require that the flow of gas to the process chamber has the ability to be controlled. In many applications, it is not desirable to deliver all of the gas for a particular recipe to the process chamber all at once. Likewise it may not be desirable to place a small portion of the gas into the process chamber at the beginning of the process and a larger portion of the gas into the process chamber at the end of the process (or vice versa). Instead it is desirable to deliver the gas to the process chamber at a controlled rate in a manner that optimizes the productivity of that process. Because the accuracy of the MFC decreases outside the 40–80% range of the particular MFC's calibrated flow rate, the degree of control over the delivery of the gas also decreases.

Other methods and apparatus are used to deliver gases to point-of-use locations. For example, the use of a variable flow valve under the control of feed-back control loop is a common method for controlling the delivery of a gas to a point-of-use location. FIG. 2 illustrates a typical prior art gas delivery system employing a variable flow valve 210 under the control of a feed-back controller 230. Gas is delivered from a gas source to a point-of-use location 250 by adjusting the throat area of valve 210 in response to a control signal 234. Control signal 234 is generated in response to a comparison between a desired flow input signal 236 and a measured flow signal 220. The desired flow input signal is generally provided through a user interface or from a preprogrammed process recipe. Measured flow signal 220 is produced by a flow meter or other flow measuring device 220 located at a point downstream of variable flow valve 210.

Over time the flow constant ($C_v$) of variable flow valve 210 changes due to wear or deposit build-up. In addition, output signal 236 of flow measuring device 220 changes over time for any given measured flow due to a phenomenon known as "drift." The change in flow constant, $C_v$, and the occurrence of "drift" both act to reduce the accuracy of the flow control apparatus. As a result, currently available feed-back flow control devices require the frequent implementation of time consuming recalibration procedures to maintain the devices within acceptable accuracy ranges. Such calibration procedures are costly in that they result in process down time and require the use of well-trained technicians to perform the procedure.

Thus, what is needed is a method and apparatus that is capable of delivering a gas flow to a processing apparatus with a high degree of accuracy over a large dynamic range.

SUMMARY OF THE INVENTION

A method and apparatus for controlling the delivery of a gas from a reservoir to a semiconductor process chamber is disclosed. In accordance with the present invention, a reservoir, having an inlet and outlet isolation valve and a known volume, is filled with a gas upon the initiation of process recipe step. The temperature and pressure of the gas in the reservoir are measured to determine an initial mass of the gas residing within the reservoir. The flow of gas from the reservoir to the process chamber is metered by a variable flow valve under the control of a self-calibrating, dynamic flow control circuit comprising a flow control servo loop (flow control circuit) and a calibration servo loop (calibration circuit). The variable flow valve is situated in a gas flow path between the reservoir and process chamber at a point upstream of an orifice. In operation, gas is delivered to the process chamber by releasing the gas from the reservoir and directing the gas through the variable flow valve and sonic orifice and into the process chamber. The flow control servo loop is used to dynamically control the variable flow valve in response to a measured gas flow rate. When the flow of gas to the process chamber is terminated, the temperature and pressure of the gas residing in the reservoir is again measured to determine the final mass of gas residing in the reservoir. The initial mass of gas and the final mass of gas values are compared to determine the actual mass of gas released from the reservoir during the recipe step. This value serves as an input to the calibration servo loop to update the system calibration constant. The execution of the calibration servo loop serves as a continuous self calibration of the dynamic servo loop.

Upon a command to initiate flow at a desired flow rate, a desired flow input signal is provided to a gain circuit. The gain circuit receives a calibration signal from the calibration servo loop and correlates the desired flow input signal to a stored nominal gas flow rate and a corresponding voltage setpoint and outputs the voltage setpoint value as a calibrated desired flow signal. The calibrated desired flow signal serves as an input to a flow control servo loop. Concurrent with, or at some time prior to generating the calibrated desired flow signal, the temperature and pressure of gas residing in the reservoir is measured to determine an initial mass of gas residing in the reservoir. Upon receiving the calibrated desired flow signal, the flow control servo loop adjusts the position of the variable control valve and gas is released from the reservoir by opening the reservoir outlet isolation valve. When the flow rate of gas through the orifice is at or above sonic speed, the flow rate of the gas flowing through the system is measured by monitoring the pressure developed upstream of the orifice. A measured flow signal corresponding to the measured pressure is provided as an input to the flow control servo loop. The flow control servo flow loop, in turn, produces a flow control signal to control the throat area of the variable flow valve in response to the calibrated desired flow signal and the measured flow signal.

Upon a command to terminate flow, the reservoir outlet isolation valve is closed and the pressure and temperature of the gas in the reservoir is measured to determine a final mass of gas remaining in the reservoir. A desired mass of gas to be released from the reservoir is determined by integrating the desired flow signal over the period of time in which the reservoir outlet isolation valve was open. Knowing the initial and final mass of gas in the reservoir permits an exact calculation of the actual mass of gas released from the reservoir into the process chamber. A comparison of the desired mass of gas to be released from the reservoir and the actual mass of gas released from the reservoir results in the determination of a correction/calibration factor. The calibration factor is used as an input to the gain circuit to update or adjust the voltage setpoint corresponding to the desired flow rate for the process step just completed. In other words, the voltage output setpoint pertaining to a particular nominal flow rate is updated upon the completion of each process recipe step to account for the difference in one or more previously derived actual flow rates and their corresponding desired flow rate. Hence, self-calibration is achieved by repeatedly updating the gain circuit setpoint values in response to precisely derived gas mass values.

In another embodiment of the present invention, the gas flow path located downstream of the reservoir outlet isolation valve is evacuated prior to releasing a gas from the reservoir. Evacuating the flow path serves to minimize the occurrence of flow spikes when gas is initially released from the reservoir.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

A method and apparatus for controlling the delivery of a gas from a reservoir to a semiconductor process chamber is disclosed. In the following description, numerous specific details are set forth such as specific materials, instrumentalities, dimensions, etc. in order to provide a thorough understanding of the present invention. It will be obvious, however, to one skilled in the art that these specific details need not be employed to practice the present invention. In other instances, well known materials, apparatus, methods, etc., have not been described in detail in order to avoid unnecessarily obscuring the present invention. Additionally, it should be noted that although the present invention is described in relation to semiconductor processing one with ordinary skill in the art will recognize that such a description is merely illustrative and is not intended to limit the invention. The specific processes and system described herein are only meant to help clarify one's understanding of the present invention and to illustrate particular embodiments in which the present invention may be implemented. It will be appreciated that the broader spirit and scope of the present invention, as set forth in the appended claims, may be applied to any type of process which seeks the achievements attained by the present invention.

Figure 1:
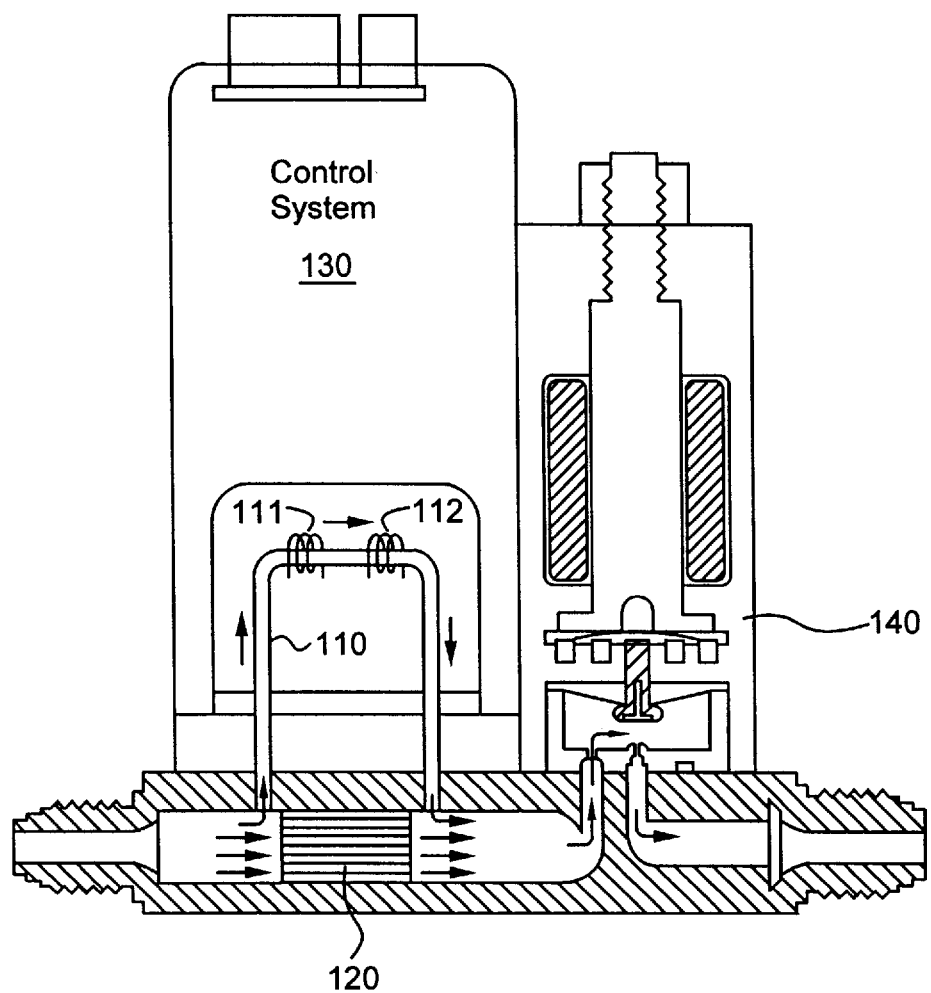
FIG. 1 illustrates a prior art Mass Flow Controller (MFC) that is used to control gas flow.
Figure 2:
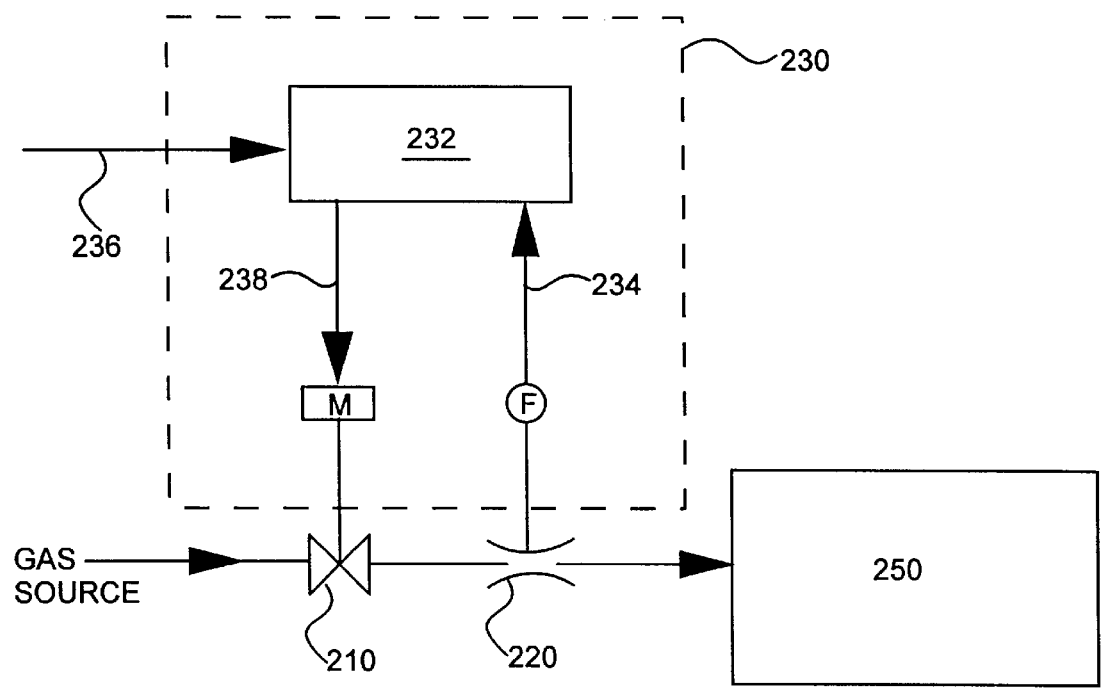
FIG. 2 illustrates a typical prior art gas delivery system.
Figure 3A:
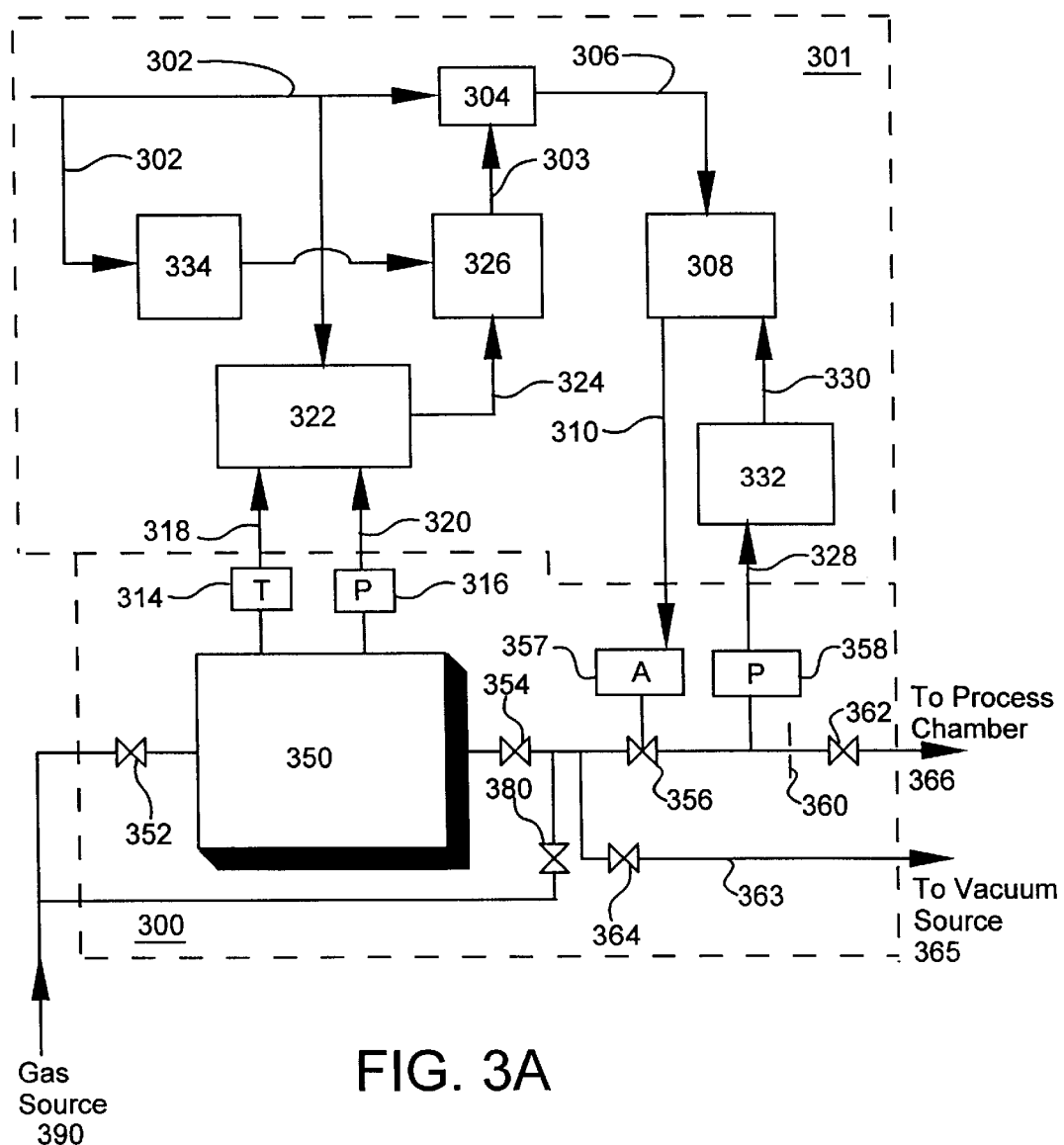
FIG. 3A illustrates a schematic diagram of one embodiment of the present invention.

FIG. 3A illustrates a schematic diagram of a gas delivery system 300 in which the present invention may be utilized. In one embodiment, a process gas is delivered to a semiconductor process chamber by releasing the gas from a reservoir 350 of a known volume into a gas flow path containing a flow control valve 356 and an orifice 360. A self-calibrating, dynamic gas flow control circuit 301 provides a control signal to the flow control valve actuator 357 to control the flow of gas through the system. Actuator 357 may include a servo motor, pneumatic controller, solenoid, etc. A pressure sensing device 358, such as a capacitance manometer, is provided in the gas flow path to measure the pressure of the gas flowing through the system at a point upstream of orifice 360. When the flow of gas through orifice 360 is critical (at or above sonic speed) the pressure of the gas located upstream the orifice is related to the flow rate of the gas passing through the orifice. In such an instance, the measured gas flow rate is calculated upon the determination of the pressure upstream orifice 360 as measured by pressure sensing device 358. When the gas flow through orifice 360 is not critical (below sonic speed), the flow of gas through the orifice is affected by the pressure in the piping downstream of the orifice. In such an instance, the flow rate of gas passing through orifice 360 is a function of the pressure upstream and downstream of the orifice.

Reservoir 350 contains an inlet isolation valve 352 and an outlet isolation valve 354. Gas is supplied to reservoir 350 from a main gas source 390. Gas may be directed from gas source 390 to process chamber 366 through reservoir 350. Alternatively, gas may be supplied to process chamber 366 through a reservoir bypass valve 380. Reservoir 350 includes a temperature measuring device 314 and a pressure measuring device 316 that are used to measure the temperature and pressure of a gas residing within the reservoir. In one embodiment, temperature sensing device 314 comprises a thermocouple and pressure sensing device 316 comprises a capacitance manometer. It should be noted, that any device for measuring the temperature and the pressure within reservoir 350 may be used in accordance with the concepts of the present invention. It is also understood that although only a single temperature measuring device and a single pressure measuring device are illustrated in FIG. 3, more than one of each of the devices may be used in order to determine an average or a mean temperature or pressure of the gas within the reservoir 350. Additionally, depending upon the size (or dimensions) of reservoir 350, the placement or positioning of the temperature and pressure measuring devices may vary in order to determine the temperature and pressure of the gas at the center, at the wall, etc.,. of reservoir 350.

A system isolation valve 362 is included within the gas delivery system piping to provide isolation between the gas delivery system and process chamber 366. In one embodiment, a vacuum source 365 is coupled to the gas delivery system piping between valves 354 and 356. The vacuum source is used to evacuate gas and/or air from the gas delivery system piping prior to initiating a gas flow to chamber 366. The process of evacuating the gas delivery system piping prior to initiating gas flow to the process chamber minimizes flow spikes inherent in conventional gas delivery systems. Valve 364 is used to isolate vacuum source 365 from the gas delivery system. In one embodiment, vacuum source 365 comprises a vacuum pump. An eductor, or any of a number of other gas evacuation apparatus known in the art, may also be used to remove entrapped gas and/or air from the gas delivery system piping. Although vacuum source 365 is shown coupled to the gas delivery system piping between valves 354 and 356, it is appreciated that the vacuum source may be coupled to the gas delivery system piping at any point between valve 354 and valve 362.

The flow of gas from reservoir 350 to process chamber 366 is metered by variable flow control valve 356 which is under the control of the self-calibrating, dynamic flow control circuit 301. In one embodiment, flow control circuit 301 comprises a flow control servo loop (flow control circuit) 308 and a calibration servo loop (calibration circuit) 326. The position of flow control valve 356 is varied by an actuator 357 that receives a control signal 310 from flow control circuit 308.

In accordance with the present invention, reservoir 350 is filled with a gas upon the initiation of process recipe step. Reservoir 350, which has a known volume, is filled with a gas by closing outlet isolation valve 354 and opening inlet isolation valve 352. After reservoir 350 is filled with gas, inlet isolation valve 352 is closed. The temperature and pressure of the gas in reservoir 350 are then measured to determine an initial mass of the gas residing within the reservoir at the beginning of the recipe step. Temperature sensing device 314 produces a temperature signal 318 that is used as an input to an arithmetic circuit 322. Pressure sensing device 316 produces a pressure signal 320 that is also used as an input to circuit 322. Upon receiving the initial temperature and pressure signals 318 and 320 from sensors 314 and 316, respectively, circuit 322 determines the initial mass of gas residing in reservoir 350 using a gas equation of state.

Figure 3B:
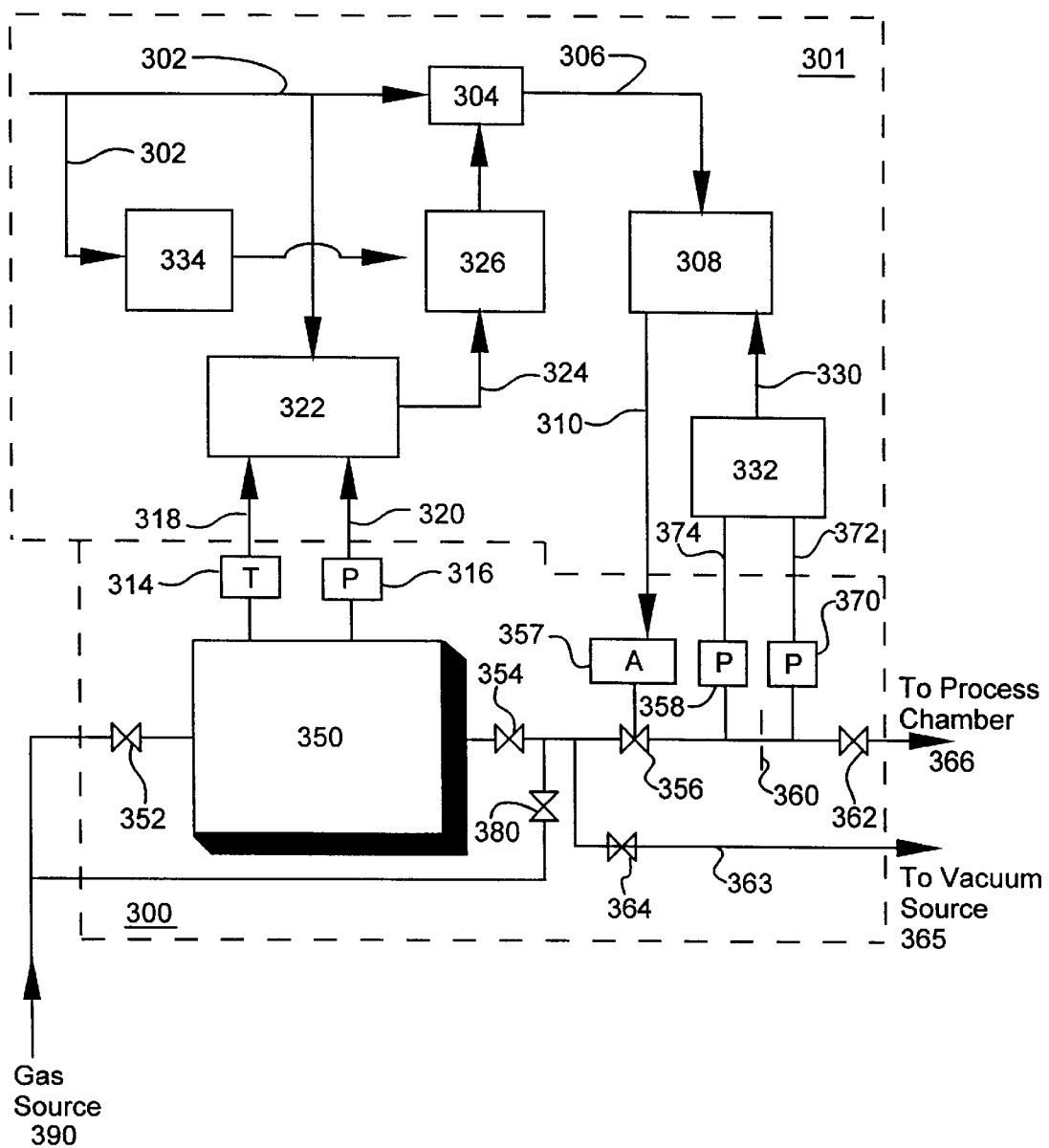
FIG. 3B illustrates a schematic diagram of another embodiment of the present invention.

Process gas is delivered to chamber 366 by releasing the gas from reservoir 350 by opening isolation valves 354 and 362. The process chamber pressure is at a lower pressure than the gas pressure in reservoir 350. Hence, as a result of opening valves 354 and 362, a gas flow is directed through the control valve 356 and orifice 360 and into process chamber 366. Flow control servo loop 308 is used to dynamically control the position of flow control valve 356 in response to a measured gas flow rate signal 330 and a calibrated desired flow input signal 306. As previously discussed, the gas pressure measured at a point upstream orifice 360 is related to the flow rate of the gas passing through the orifice when the flow rate is at or above sonic speed. In one embodiment, the correlation between the pressure measured by pressure sensing device 358 and the gas flow rate is linearized and stored within an orifice linearization circuit 332. In such an embodiment, the pressure signal 328 produced by device 358 is used as an input to circuit 332. Circuit 332 converts pressure signal 328 into a measured flow signal 330 which serves as an input to flow control servo 308. The calibrated desired flow input signal 306 is provided to flow control servo 308 by a gain circuit 304. A second pressure sensing device 370 may be positioned at a point downstream of orifice 360 as shown in FIG. 3B. In this manner the differential pressure across orifice 360 may be determined and used as an input to circuit 332. In such an embodiment circuit 332 converts the differential pressure signal 372 into the measured flow signal 330 which serves as an input to flow control servo 308.

Upon a command to initiate flow at a desired flow rate, a desired flow input signal 302 is provided to gain circuit 304. Gain circuit 304 receives a calibration signal 303 from the calibration servo loop 326 and correlates the desired flow input signal to a stored nominal gas flow rate and a corresponding voltage setpoint and outputs the voltage setpoint value as a calibrated desired flow signal 306. As noted above, the calibrated desired flow input signal 306 serves as an input to the flow control servo loop 308. Upon receiving calibrated desired flow input signal 306, flow control servo loop 308 compares signals 306 and 330 and produces control signal 310 to adjust the position of flow control valve 356.

When the process recipe step is complete, the flow of gas from reservoir 350 to process chamber 366 is terminated by closing reservoir outlet isolation valves 354 and system isolation valve 362. The temperature and pressure of the gas residing in reservoir 350 is again measured to determine the final mass of gas residing in the reservoir. The temperature and pressure measurements are obtained via temperature and pressure sensing devices 314 and 316. The final mass of gas residing in reservoir 350 is calculated by circuit 322. Circuit 322 compares the initial mass of gas and the final mass of gas residing in the reservoir and produces an output signal 324 that represents the actual mass of gas released from the reservoir during the recipe step. Since a small amount of gas is trapped within the piping situated between valves 354 and 362, circuit 322 may be configured to account for the amount of gas residing within the piping when determining the actual amount of gas delivered to chamber 366. In high volumetric flow cases the amount of gas trapped within the piping between valves 354 and 362 may be insignificant. In such situations it may not be necessary to account for the trapped gas when determining the amount of gas actually delivered to chamber 366. Signal 324 serves as an input to calibration servo loop 326.

A signal corresponding to the desired amount of gas to be released from reservoir 350 during the recipe step is determined by integrating the desired flow input signal 302 over the period of time in which the reservoir outlet isolation valve 354 was open during the recipe step. Integration circuit 334 performs the integrating function and generates a signal 336 that is representative of the desired amount of gas to be released during the just completed process recipe step. A comparison of the desired mass of gas to be released from the reservoir (signal 336) and the actual mass of gas released from the reservoir (signal 324) results in the determination of a correction/calibration signal 303 which is determined by the calibration servo loop 326. In one embodiment, calibration servo loop 326 comprises a proportional integral derivative (PID) controller. Calibration signal 303 is used as an input to gain circuit 304 to update or adjust the voltage setpoint corresponding to the desired flow rate for the process step just completed. In other words, the voltage output setpoint pertaining to a particular nominal flow rate is updated upon the completion of each process recipe step to account for the difference in one or more previously derived actual flow rates and their corresponding desired flow rate. Hence, self-calibration is achieved by repeatedly updating the gain circuit setpoint values in response to precisely derived gas mass values.

Because the present invention uses precisely derived values in determining the actual mass of gas delivered to the process chamber during a recipe step, the calculation of the system calibration constant serves as an absolute and independent measure of the performance of the gas delivery system. For instance, it is known that the flow constant, $C_v$, of orifice 360 and flow control valve 356 changes over time due to thermal effects, wear, and particle build up. In addition, it is known that the output signal of instrumentation devices, such as capacitance manometer 358, experience drift which can affect the accuracy of the flow servo loop 308 over time. Since the present invention is capable of establishing a system calibration constant that is independent of the variables inherent in gas delivery system components, the present invention has the ability to control gas flow rates at accuracy levels that are much higher than those obtainable using MFC's or other conventional flow control systems. Moreover, the dynamic range (ratio of the maximum controlled gas flow to the minimum controlled gas flow) of the gas flow delivery system is greatly enhanced over the prior art methods. For example, conventional flow control devices have a dynamic range of 10/1 or less. Dynamic ranges in the range of 200/1 and greater may be achieved with the gas flow delivery system and methods of the present invention.

In some instances it may be desirable to bypass reservoir 350. In such a case, gas may be routed through reservoir bypass valve 380 and into process chamber 366 through control valve 356. When reservoir 350 is bypassed, previously derived calibration values are used in conjunction with other control parameters to control the flow of gas through flow control valve 356.

In the foregoing description, the self-calibrating, dynamic flow control system 301 has been described to include a variety of circuits that operate in conjunction with one another to produce a calibrated flow control signal. It is appreciated that the present invention is not limited to the use of a specific set of control system components. For example, conventional electrical/electronic switching techniques and conventional solid state microprocessor techniques may be used to control the flow of gas in accordance with the methods of the present invention. Such components may include a computer or microprocessor, a digital signal;processor, firmware, digital hardware, discrete hardware, software routines, programmable hardware or integrated circuits, output signal amplifiers, storage memory, etc. In one embodiment control system 301 also includes look-up tables to aid in the initial positioning of control valve 356 at the beginning of a process recipe step. The look-up tables includes calibration information relating to the specific process gas being delivered and control valve positions that enable control system 301 to establish the initial position of control valve 356 when given the initial pressure and temperature of the process gas residing in reservoir 350. It will also be obvious to one with ordinary skill in the art, that reservoir inlet isolation valve 352, reservoir outlet isolation valve 354, system isolation valve 362 and vacuum purge valve 364 may be automatically operated by the same control system, or by different control systems. In one embodiment control system 301 operates the inlet and outlet isolation valves 352 and 354, respectively, along with control valve 356.

The previous description has included the use of a temperature measurement in order to determine the initial mass of gas and final mass of gas residing within reservoir. It is understood that such a temperature measurement is not required when the gas delivery system is operated under isothermal conditions. Therefore, if the temperature of gas in reservoir 350 is held constant by a temperature control system, or other apparatus, there is no need to measure the temperature of gas as prescribed above.

The size of orifice 360, the size of the throat (flow area) of flow control valve 356, and the size of reservoir 350 may vary depending upon the particular flow requirements of the gas delivery system. In one embodiment, the gas delivery system components are sized and controlled in order to maintain a pressure of between 2 to 10 psia upstream orifice 360. Controlling the pressure upstream of the orifice allows the user to control the dynamic control range of the system.

Figure 5:
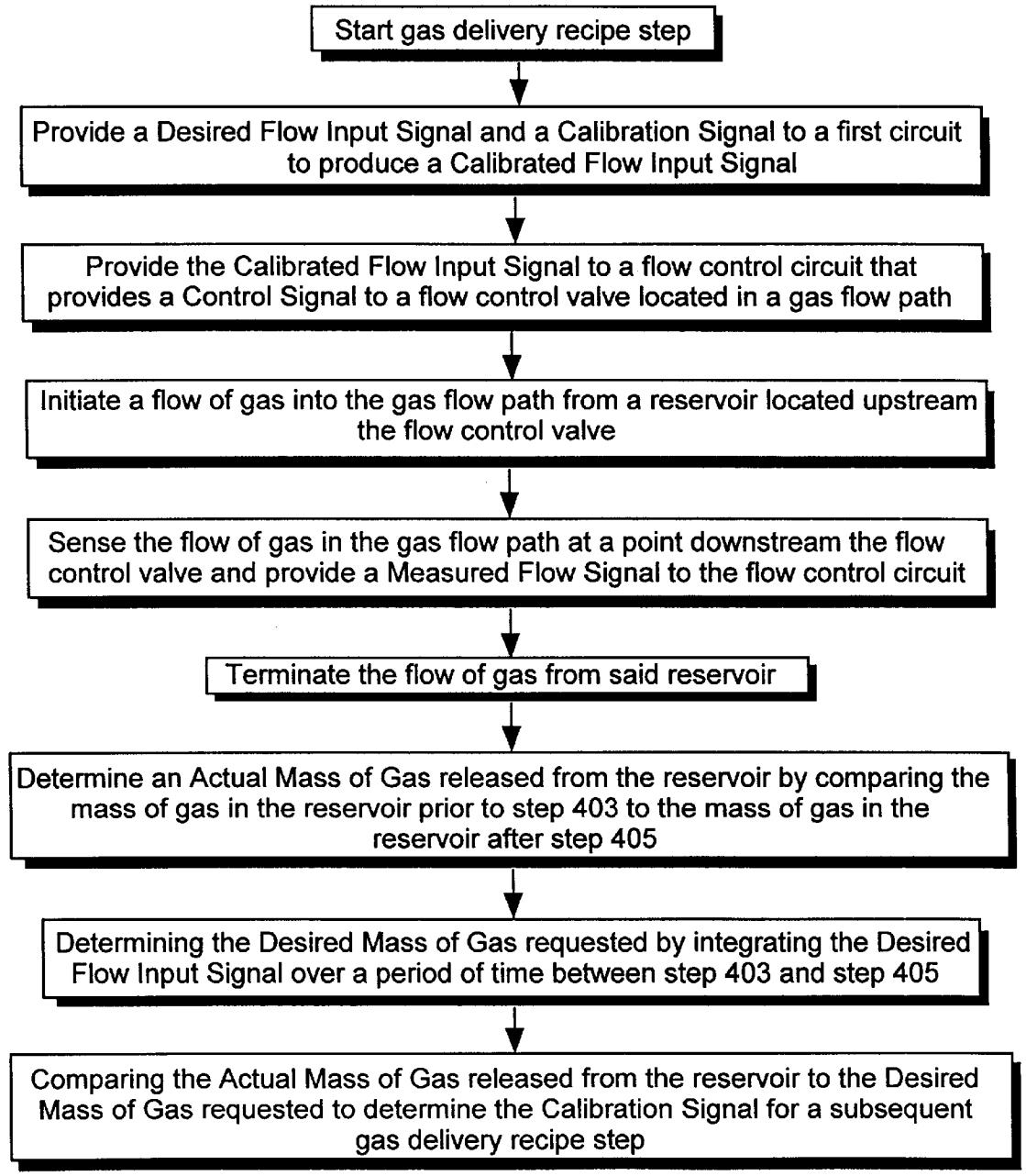
FIG. 5 illustrates a flow chart of one embodiment of the present invention.

FIG. 5 illustrates a flow chart representing the method used to control the flow of gas from reservoir 350 to process chamber 366 during a process recipe step in accordance with present invention. Upon the initiation of a process recipe step, a Desired Flow Input Signal 302 and a Calibration Signal 306 is provided to flow control circuit 308 to produce a Calibrated Desired Flow Input Signal 310. Concurrent with, or at some time prior to generating the Calibrated Desired Flow Input Signal 310, reservoir 350 is filled and the temperature and pressure of the gas in the reservoir is measured to determine an initial mass of gas residing in the reservoir. Upon receiving the Calibrated Desired Flow Input Signal, flow control circuit 308 provides a Control Signal to flow control valve 356 to adjust the position of the flow control valve. A gas flow from reservoir 350 to process chamber 366 is initiated by opening reservoir outlet isolation valve 354 and system isolation valve 362. The flow rate of the gas is measured by sensing the pressure of the gas at a point upstream of sonic orifice 360. A Measured Flow Signal 330 is provided to circuit 308 which corresponds to the pressure measured by the pressure sensing device 358. Upon the completion of the process recipe step, the flow of gas from reservoir 350 to process chamber 366 is terminated by closing reservoir outlet isolation valve 354. The final mass of gas remaining in reservoir 350 is determined by again measuring the temperature and pressure of the gas in the reservoir. The actual mass of gas released from the reservoir is then calculated by subtracting the final mass calculation from the initial mass calculation. An Actual Mass Signal 324 representative of this calculation is provided to calibration circuit 326. In conjunction with determining the actual mass of gas dispensed from reservoir 350, the desired mass of gas requested for the just completed recipe step is calculated by integrating the Desired Flow Input Signal over a period of time in which gas was released from reservoir 350 into process chamber 366. This function is typically performed by an integrating circuit 334 which produces a Desired Mass of Gas Requested Signal 336. The Desired Mass of Gas Signal 336 also serves as an input to calibration circuit 326. Upon receiving signals 324 and 336, calibration circuit 326 determines an updated system calibration factor and produces a Calibration Signal 303 relating to a comparison between signals 324 and 336. The updated Calibration Signal 303 is then used in a subsequent process recipe step to appropriately adjust the Desired Flow Input Signal 302 to a Calibrated Desired Flow Input Signal 306.

In one embodiment, the portion of the gas delivery system 300 that is located between isolation valves 354 and 362 is evacuated prior to initiating a gas flow from reservoir 350 to chamber 366. Evacuation of gases and/or entrapped air from the system is achieved by opening purge isolation valve 364 to permit a vacuum to be drawn on the system by a vacuum pump, or other vacuum source. As previously noted, evacuating the flow path serves to minimize the occurrence of flow spikes when gas is initially released from the reservoir into the process chamber.

Figure 4:
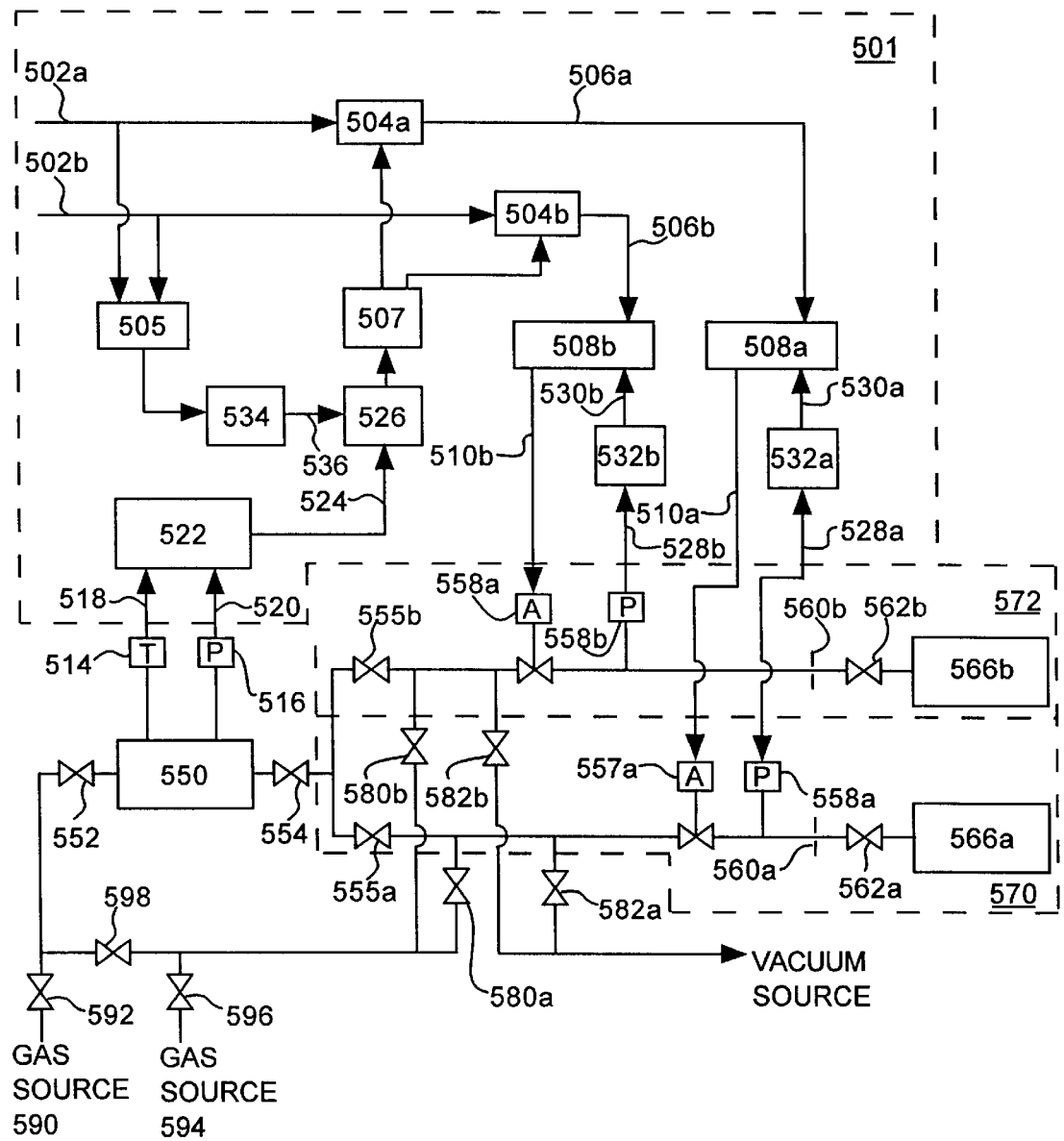
FIG. 4 illustrates a schematic diagram of yet another embodiment of the present invention.

The foregoing description has been limited to a gas delivery system and method wherein gas is delivered from a reservoir of a known volume to a single gas flow channel. It is to be understood, however, that the gas delivery system of the present invention is not limited to the delivery of gas through a single gas flow controller. FIG. 4, a gas flow control system wherein the teachings of the present invention are used to deliver gas from a reservoir 550 to a plurality of gas flow channels 570 and 572. Although FIG. 4 illustrates a gas flow control system containing two separate flow channels 570 and 572, it is appreciated that the present invention is not limited to such an embodiment and may include any number of gas flow channels connected to one or more process chambers.

In the system of FIG. 4, a process gas may be delivered from reservoir 550 to either of process chambers 566a or 566b by releasing a gas from the reservoir into either of gas flow channels 570 or 572, respectively. A gas source 590 or multiple gas sources (590 and 594) supply gas to reservoir 550. In some instances it may be desirable to direct a gas through either gas flow channel 570 or 572 without the gas first passing through reservoir 550. Reservoir bypass valves 580a and 580b are provided in the gas supply piping to permit such a flow scheme. Gas flow channel 570 includes an isolation valve 555a, a flow control valve 556a, a pressure sensing device 558a, an orifice 560a, and a system isolation valve 562a. Similarly, gas flow channel 572 includes an isolation valve 555a, a flow control valve 556b, a pressure sensing device 558b, an orifice 560b, and a system isolation valve 562b. A second pressure sensing device (not shown) may be included in both gas flow channels 570 and 572 at a point downstream of orifices 560a and 560b. In accordance with the present invention, a self-calibrating, dynamic gas flow control circuit 501 provides a control signal 510a or 510b to either of flow control valve actuators 557a or 557b to control the flow of gas to process chambers 566a or 566b, respectively.

Reservoir 550 contains an inlet isolation valve 552 and an outlet isolation valve 554. Reservoir 550 also includes a temperature measuring device 514 and a pressure measuring device 516 that are used to measure the temperature and pressure of a gas residing within the reservoir.

When a flow of gas from reservoir 550 to process chamber 566a is desired, the gas flow is metered by variable flow control valve 556a which is under the control of actuator 557a. Conversely, when a flow of gas from reservoir 550 to process chamber 566b is desired, the gas flow is metered by variable flow control valve 556b which is under the control of actuator 557b. Two flow control servo loops 508a and 508b are included within circuit 501 to provide control signals 510a or 510b to actuators 557a and 557b, respectively. Each of flow control servo loops 508a and 508b function in a similar manner to the flow control servo loop 308 described in FIG. 3A. Flow control servo loop 508a receives as inputs a calibration signal 506a and a measured gas flow rate signal 530a. An orifice linearization circuit 532a produces signal 530a in response to a measured pressure signal 528a. Flow control servo loop 508b receives as inputs a calibration signal 506b and a measured gas flow rate signal 530b. An orifice linearization circuit 532b produces signal 530b in response to a measured pressure signal 528b.

In accordance with one embodiment of the present invention, reservoir 550 is filled with a gas upon the initiation of process recipe step. Reservoir 550, which has a known volume, is filled with a gas by closing outlet isolation valve 554 and opening inlet isolation valve 552. After reservoir 550 is filled with gas, inlet isolation valve 552 is closed. The temperature and pressure of the gas in reservoir 550 are then measured to determine an initial mass of the gas residing within the reservoir at the beginning of the recipe step. Temperature sensing device 514 produces a temperature signal 518 that is used as an input to an arithmetic circuit 522. Pressure sensing device 516 produces a pressure signal 520 that is also used as an input to circuit 522. Upon receiving the initial temperature and pressure signals 518 and 520 from sensors 514 and 516, respectively, circuit 522 determines the initial mass of gas residing in reservoir 550 using a gas equation of state.

Process gas may be delivered to either of process chambers 566a or 566b through reservoir 550. For example, gas is delivered to process chamber 566a by releasing a gas from reservoir 550 by opening reservoir outlet isolation valve 554 and gas flow channel 570 isolation valves 555a and 562a. Since the process chamber pressure is at a lower pressure than the gas pressure in reservoir 550, a gas flow is directed through the control valve 556a and orifice 560a and into process chamber 566a. Flow control servo loop 508a is used to dynamically control the position of flow control valve 556a in response to a measured gas flow rate signal 530a and a calibrated desired flow input signal 506a. When the flow rate of the gas passing through orifice 560a is greater than sonic speed, the gas pressure measured by pressure sensing device 558a is related to the flow rate of the gas passing through orifice 560a. In one embodiment, the correlation between the pressure measured by pressure sensing device 558a and the gas flow rate is linearized and stored within an orifice linearization circuit 532a. In such an embodiment, the pressure signal 528a produced by device 558a is used as an input to circuit 532a. Circuit 532a converts pressure signal 528a into a measured flow signal 530a which serves as an input to flow control servo 508a. The calibrated desired flow input signal 506a is provided to flow control servo 508a by a gain circuit 504a. As noted above, a second pressure sensing device (not shown) may be positioned at a point downstream of orifice 560a so that the differential pressure across orifice 560a may be determined and used as an input to circuit 532. In such an embodiment circuit 532 receives a differential pressure signal and converts the signal into a measured flow signal 530a which serves as an input to flow control servo 508a.

Upon a command to initiate flow at a desired flow rate to process chamber 566a, a desired flow input signal 502a is provided to gain circuit 504a. Conversely, when a gas flow is chosen to be directed through flow channel 572 and into process chamber 566b, a signal 502b is provided to gain circuit 504b. When gas flow channel 570 is selected to receive a gas flow from reservoir 550, gain circuit 504a receives a calibration signal 503 from the calibration servo loop 526 through a multiplexer 507 and correlates the desired flow input signal to a stored nominal gas flow rate and a corresponding voltage setpoint and outputs the voltage setpoint value as a calibrated desired flow signal 506a. Multiplexer 507 directs signal 503 to either gain circuit 504a or 504b depending upon the flow channel that is selected to receive gas from reservoir 550. As noted above, the calibrated desired flow input signal 506a serves as an input to the flow control servo loop 508a. Upon receiving calibrated desired flow input signal 506a, flow control servo loop 508a compares signals 506a and 530a and produces control signal 510a to adjust the position of flow control valve 556a.

When the process recipe step is complete, the flow of gas from reservoir 550 to process chamber 566a is terminated by closing reservoir outlet isolation valve 554a and channel isolation valve 555a and 562a. The temperature and pressure of the gas residing in reservoir 550 is again measured to determine the final mass of gas residing in the reservoir. The temperature and pressure measurements are obtained via temperature and pressure sensing devices 514 and 516. The final mass of gas residing in reservoir 550 is calculated by circuit 522. Circuit 522 compares the initial mass of gas and the final mass of gas residing in the reservoir and produces an output signal 524 that represents the actual mass of gas released from the reservoir during the recipe step. Since a small amount of gas is trapped within the piping situated between valves 554a and 562a, circuit 522 may be configured to account for the amount of gas residing within the piping when determining the actual amount of gas delivered to chamber 566a. Signal 524 serves as an input to calibration servo loop 526.

A signal corresponding to the desired amount of gas to be released from reservoir 550 during the recipe step is determined by integrating either the desired flow input signal 502a or 502b over the period of time in which the reservoir outlet isolation valve 554a was open during the recipe step. Multiplexer 505 may be selected to direct either of signals 502a or 502b to integration circuit 534, depending upon the gas flow channel that is chosen to receive gas from reservoir 550. Integration circuit 534 performs the integrating function and generates a signal 536 that is representative of the desired amount of gas to be released during the just completed process recipe step. A comparison of the desired mass of gas to be released from the reservoir (signal 536) and the actual mass of gas released from the reservoir (signal 524) results in the determination of a correction/calibration signal 503 which is determined by the calibration servo loop 526. As previously discussed, calibration signal 503 is provided to either of gain circuits 504a or 504b through multiplexer 507. In one embodiment, calibration servo loop 526 comprises a proportional integral derivative (PID) controller. Calibration signal 503 is used as an input to gain circuit 504a to update or adjust the voltage setpoint corresponding to the desired flow rate for the process step just completed. In other words, the voltage output setpoint pertaining to a particular nominal flow rate is updated upon the completion of each process recipe step to account for the difference in one or more previously derived actual flow rates and their corresponding desired flow rate. Hence, self-calibration is achieved by continuously updating the gain circuit setpoint values in response to precisely derived gas mass values. Gain circuit 504a includes a memory device for storing the updated setpoint values. A gas flow from reservoir 550 to process chamber 566b is controlled in a like manner. When process chamber 566b is selected to receive a gas flow from reservoir 550, multiplexer 505 directs signal 502b to integration circuit 534 and multiplexer 507 directs calibration signal 503 to gain circuit 504b.

In accordance with one embodiment of the present invention, a gas flow may be delivered to one gas flow channel (570 or 572) from reservoir 550, while the same gas or another gas is being delivered to the other gas flow channel. For example, gas from gas source 590 may be directed to reservoir 566a through reservoir 550 while another gas from gas source 594 is being delivered to process chamber 566b. An isolation valve 598 is provided between gas source isolation valves 592 and 596. In such an embodiment, gas source isolation valve 592 is opened while filling reservoir 550 and valve 598 is closed. Gas is directed from reservoir 550 through flow channel 570 by opening reservoir outlet isolation valve 554 and channel inlet isolation valve 555a. While gas is being supplied to process chamber 566a, another gas is delivered to process chamber 566b through flow channel 572. Gas is supplied to flow channel 572 by opening gas source isolation valve 596 and reservoir bypass valve 580b. In this manner, flow may be simultaneously directed through flow channels 570 and 572 and into process chambers 566a and 556b, respectively. Gas flow through flow channel 570 is controlled by flow control valve 556a in accordance with the self-calibration flow control method described above while the gas flow through flow channel 572 is controlled by flow control valve 556b using previously derived calibration values. Although FIG. 4 illustrates a gas flow system having two gas sources and two gas flow channels, it is appreciated that any number of gas sources and gas flow channels may be incorporated into the gas delivery system without deviating from the spirit and scope of the invention.

In one embodiment, a vacuum source 565 is coupled to the gas delivery system piping between reservoir outlet isolation valve 554 and gas flow channel isolation valves 555a and 555b. The vacuum source is used to evacuate gas and/or air from the gas delivery system piping prior to initiating a gas flow to either of chambers 566a or 566b. Valve 564 is used to isolate vacuum source 565 from the gas delivery system. Although vacuum source 565 is shown coupled to the gas delivery system piping at a point just downstream flow channel isolation valves 555a and 555b, it is appreciated that the vacuum source may be coupled to the gas delivery system piping at any point between reservoir isolation valves 555a and 555b and chambers 566a and 566b.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

What is claimed is:

1. A method for controlling a gas flow out of a reservoir of a known volume comprising the steps of:

providing a desired flow input signal and a calibration signal to a first circuit and producing a calibrated flow input signal, providing said calibrated flow input signal to a flow control circuit, said flow control circuit producing a control signal to a flow control valve located in a gas flow path downstream of said reservoir to control said gas flow;

releasing a gas from said reservoir by opening a reservoir outlet isolation valve;

sensing said gas flow in said gas flow path at a location downstream of said flow control valve and providing a measured flow signal indicative thereof to said flow control circuit;

calculating a desired mass of gas to be released from said reservoir by integrating said desired flow input signal over a period of time in which said reservoir outlet isolation valve is open and producing a first signal indicative thereof;

calculating an actual mass of gas released from said reservoir by comparing a first mass of gas residing in said reservoir at a first time prior to opening said outlet isolation valve, to a second mass of said gas residing in said reservoir at a second time after said output isolation valve is closed, and producing a second signal indicative thereof; and comparing said first and second signals to produce an updated calibration signal.

2. The method of claim 1 wherein said reservoir has an inlet isolation valve, said gas flow being produced by filling said reservoir with said gas while said inlet isolation valve is open and said outlet isolation valve is closed;

closing said inlet isolation valve; and opening said outlet isolation valve.

3. The method of claim 1 wherein said first mass and said second mass of said gas is determined by measuring the temperature and pressure of said gas in said reservoir at said first and second time, respectively.

4. The method of claim 1 wherein the step of sensing said gas flow includes measuring the pressure of said gas at a point upstream an orifice that is located at a point downstream of said control valve.

5. The method of claim 1 wherein the step of sensing said gas flow includes measuring the pressure of said gas at a point upstream and a point downstream of an orifice that is located at a point downstream of said control valve.

6. The method of claim 1 wherein the step of producing said updated calibration signal is performed by a PID controller.

7. The method of claim 1 wherein said calibration signal is produced by comparing a plurality of previous first signals with a plurality of corresponding second signals and averaging the sum of the comparisons.

8. A gas flow control method comprising the steps of:

providing a desired flow rate input signal representing a desired gas flow rate and a calibration signal to a first circuit to produce a calibrated flow input signal;

providing said calibrated flow input signal to a flow control circuit, said flow control circuit producing a control signal to a flow control valve located in a gas flow path downstream of a gas reservoir;

filling said reservoir with a gas, wherein said reservoir has a known volume, an inlet isolation valve, an outlet isolation valve and wherein said step of filling is performed while said inlet isolation valve is open and said outlet isolation valve is closed;

closing said inlet isolation valve after said filling step;

measuring the pressure and temperature of said gas in said reservoir to determine a first mass of said gas in said reservoir;

opening said outlet isolation valve at a first time to release said gas into said flow path, said flow path having an orifice located downstream of said flow control valve;

controlling the flow rate of said gas through said flow path, wherein the step of controlling said flow rate includes measuring the flow rate of said gas between said control valve and said sonic orifice to produce a measured flow rate signal indicative thereof and providing said measured flow rate signal to said flow control circuit;

comparing said measured flow rate signal to said calibrated flow input signal to produce said control signal relating to this comparison; and adjusting a valve opening of said flow control valve in response to said control signal to control the flow rate of said gas;

closing said outlet isolation valve at a second time;

measuring the pressure and temperature of said gas in said reservoir to determine a second mass of said gas in said reservoir;

calculating a desired mass of gas to be released from said reservoir by integrating said desired flow input signal over a period of time between said first time and said second time, and producing a first signal indicative thereof;

determining an actual mass of gas released from said reservoir by comparing said first mass and said second mass of said gas in said reservoir, and producing a second signal indicative thereof; and comparing said first and second signals to produce an updated calibration signal.

9. The method of claim 8 wherein the step of measuring the flow rate of said gas includes measuring the pressure of said gas at a point upstream said orifice.

10. The method of claim 8 wherein the step of adjusting said valve opening of said flow control valve includes providing said control signal to an actuator that changes a valve throat position in response to said control signal.

11. The method of claim 8 wherein the step of producing said updated calibration signal is performed by a PID controller.

12. The method of claim 8 wherein said calibration signal is produced by averaging said updated calibration signal with at least one previously derived calibration signal corresponding to said desired flow irate input signal.

13. The method of claim 8 further comprising the step of evacuating said flow path prior to releasing said gas into said flow path.

14. A gas flow control apparatus comprising:
- a reservoir of a known volume having an inlet isolation valve and an outlet isolation valve;
- a pressure measuring device for measuring the pressure of a gas in said reservoir, said pressure measuring device producing a pressure signal;
- a temperature measuring device for measuring the temperature of said gas in said reservoir, said temperature measuring device producing a temperature signal;
- a gas flow control valve located in a gas path downstream of said outlet isolation valve, said fluid flow control valve controlled by a control signal;
- an orifice located in said gas path downstream of said gas flow control valve;
- a pressure measuring device that produces an output flow signal indicative thereof;
- a conversion circuit that receives said pressure signal and outputs a flow signal indicative of the gas flow rate through said orifice; and
- a gas flow control circuit for generating said control signal, said gas flow control circuit comprising
  - a first circuit configured to receive a desired flow input signal and a calibration signal, said first circuit for producing a calibrated flow input signal in response to said desired flow input signal and said calibration signal;
  - a second circuit configured to compare said calibrated flow input signal with said flow signal to produce said control signal; and
  - a third circuit to produce said calibration signal in response to said pressure and desired flow input signals.

15. The gas flow control apparatus of claim 14 wherein said third circuit produces said calibration signal in response to said temperature, pressure and desired flow input signals.

16. The gas flow control apparatus of claim 14 wherein said third circuit comprises a PID controller.

17. The gas flow control apparatus of claim 14 wherein said temperature measuring device comprises a thermocouple.

18. The gas flow control apparatus of claim 14 wherein said pressure measuring device comprises a manometer.

19. The gas flow control apparatus of claim 14 wherein said gas flow control valve includes an actuator that changes a valve disk position in response to said control signal.

20. The gas flow control apparatus of claim 14 wherein said gas flow sensor comprises a pressure manometer.

21. The gas flow control apparatus of claim 14 wherein said third circuit produces said calibration signal by statistically averaging said calibration signal with at least one previous calibration signal corresponding to said desired flow input signal.

22. The gas flow control apparatus of claim 14 further including means for evacuating said gas from said gas flow path.

23. The gas flow control apparatus of claim 22 wherein said means for evacuating said gas from said gas flow path includes a vacuum pump.

* * * * *